(12) United States Patent
Maffeis

(10) Patent No.: US 8,007,018 B2
(45) Date of Patent: Aug. 30, 2011

(54) ONE-FINGER GRIPPER DEVICE

(75) Inventor: Giuseppe Maffeis, Roncadelle (IT)

(73) Assignee: GIMATIC S.p.A., Roncadelle (Brescia) (IT)

(*) Notice: Subject to any disclaimer, the term of this patent is extended or adjusted under 35 U.S.C. 154(b) by 299 days.

(21) Appl. No.: 12/388,090

(22) Filed: Feb. 18, 2009

(65) Prior Publication Data

US 2009/0212582 A1 Aug. 27, 2009

(51) Int. Cl.
*B25J 15/00* (2006.01)
(52) U.S. Cl. .......................... 294/88; 294/119.1; 269/32
(58) Field of Classification Search ................. 294/88, 294/103.1, 119.1; 269/32
See application file for complete search history.

(56) References Cited

U.S. PATENT DOCUMENTS

| | | | | |
|---|---|---|---|---|
| 2,212,332 A * | 8/1940 | Van Sittert et al. | ............. | 74/110 |
| 2,354,841 A * | 8/1944 | Shaff | ............... | 91/355 |
| 2,417,625 A * | 3/1947 | Bates | ............... | 269/30 |
| 3,830,022 A * | 8/1974 | Shaw et al. | ..................... | 269/32 |
| 4,892,344 A * | 1/1990 | Takada et al. | .................. | 294/88 |
| 5,149,070 A * | 9/1992 | Dykstra | .......................... | 269/32 |
| 6,308,943 B1 * | 10/2001 | Fischer et al. | .................. | 269/32 |
| 6,494,516 B1 * | 12/2002 | Bertini | ............................ | 294/88 |

* cited by examiner

*Primary Examiner* — Dean J Kramer
(74) *Attorney, Agent, or Firm* — McGlew and Tuttle, P.C.

(57) ABSTRACT

The invention concerns a one-finger gripper device that comprises a pneumatic actuator (10) with a control piston (16) that is connected to a gripper jaw (19) for the movement of the latter between an active and idle position, and where the gripper jaw (19) is set up and susceptible to linear movements on a (Y) axis at right angles to the (X) axis of the control piston, the piston and the gripper jaw being connected to each other by a transmission at 90°.

15 Claims, 2 Drawing Sheets

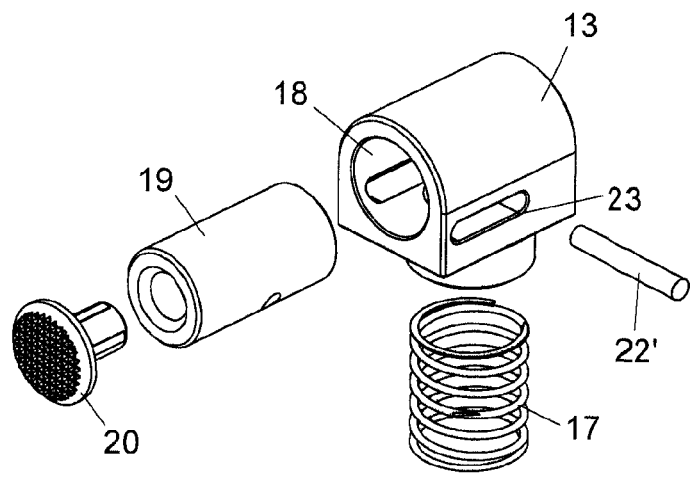
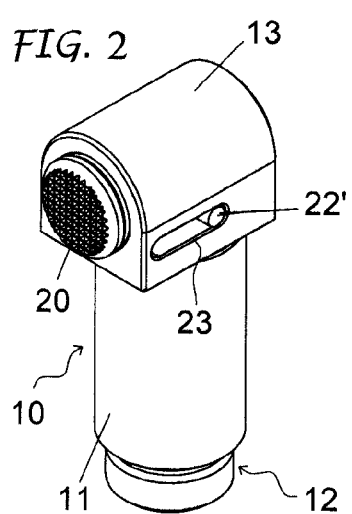
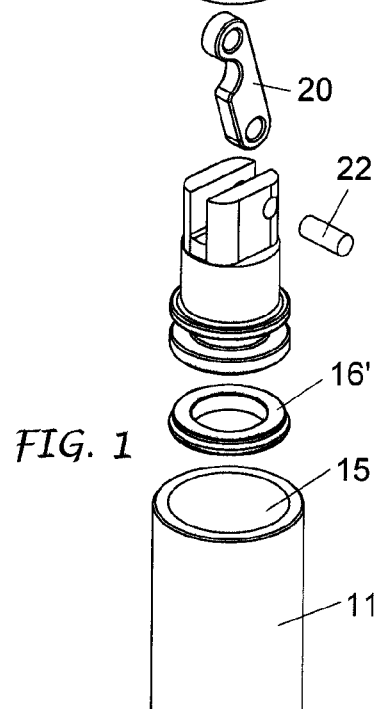
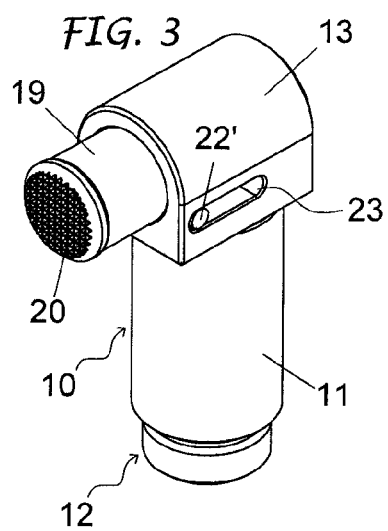
FIG. 1
FIG. 2
FIG. 3

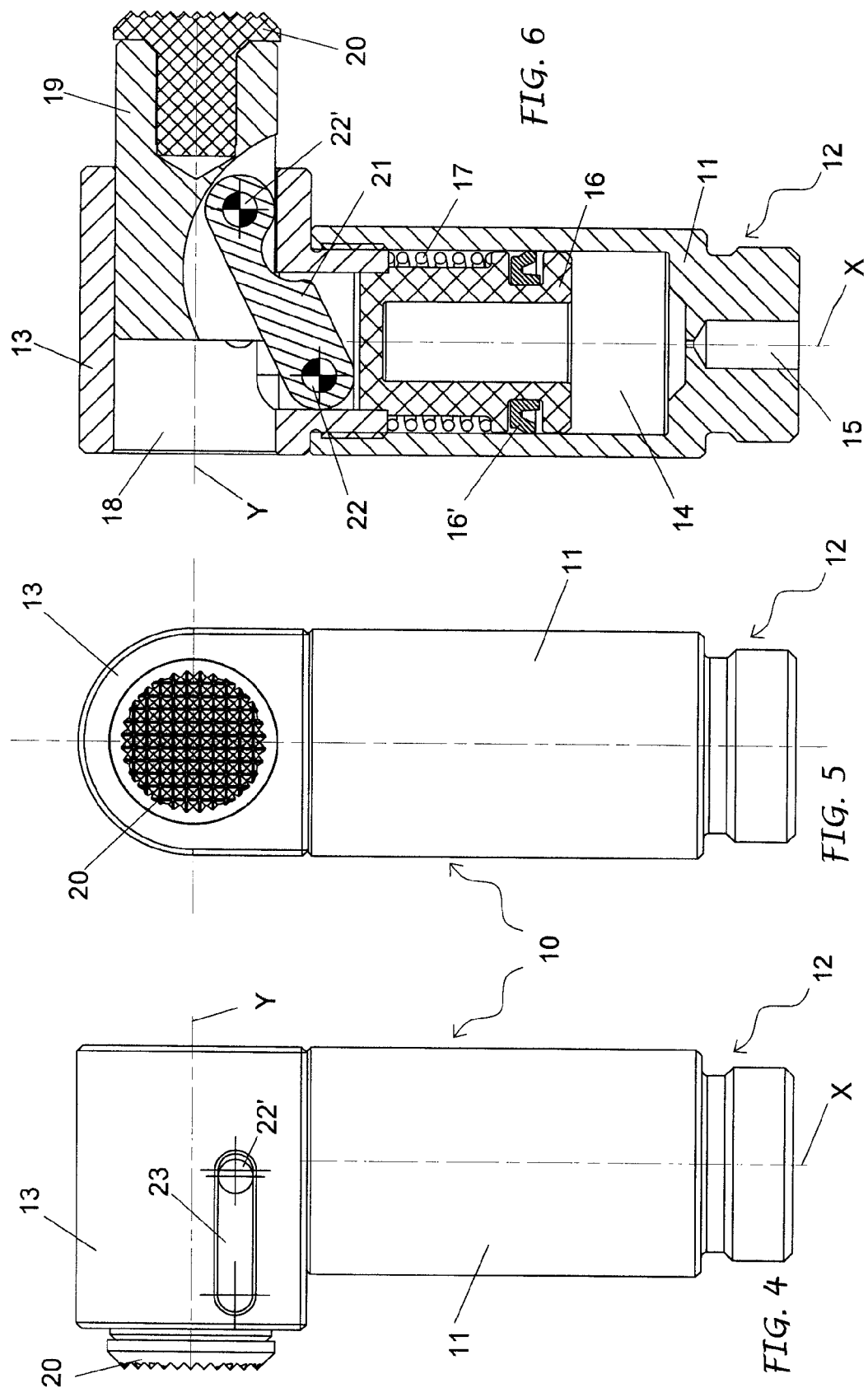

ONE-FINGER GRIPPER DEVICE

FIELD OF THE INVENTION

This invention concerns a one-finger gripper tool usable in combination with at least another similar tool to grip, position and/or block bodies or items being handled, extracted from dies or the like.

STATE OF THE TECHNIQUE

The one finger gripper tools known from the technique basically comprise a pneumatic actuator with a piston which connects directly or indirectly up to a gripper jaw for the moving of the latter between an active and idle positions.

According to a well known form of construction, the gripper jaw is positioned and is movable in axis with the piston it is connected to. In this way, however, the pneumatic actuator dimensions accumulate which, often makes the device configured in this way unsuitable where the spaces available are restricted and/or not easily accessible as for example, with dies used with press-forging machines.

According to another way of construction, the gripper jaw is connected to the control piston, pivoted to the body of the device and susceptible to angular movements between a position in line and an angled position with respect to the piston. Also in this case, however, the gripper device has a significant size and can cause problems as regards to collocation.

OBJECTIVES AND SUMMARY OF THE INVENTION

The objective of this invention is to avoid the drawbacks and problems of the known techniques with a one finger gripper easier and less expensive to make, and above all less cumbersome and consequently easier to collocate to be used.

This objective is reached in accordance with the invention by a one finger gripper that is characterized in that the gripper jaw is positioned and susceptible to linear movements on a right angle axis to the axis of the pneumatic control piston of the actuator, the piston and the jaw being connected by means of a driving gear at 90°.

BRIEF DESCRIPTION OF THE DRAWINGS

Further details of the invention will however become evident in the continuation of the description made in reference to the enclosed indicative and not limiting drawings, in which:

FIG. 1 shows, an exploded view in perspective of the components of the one finger gripper tool;

FIGS. 2 and 3 show a view in perspective of the assembled gripper tool, in the idle and active positions respectively;

FIGS. 4 and 5 show, respectively, an enlarged side and front view of the gripper tool; and FIG. 6 shows an axial section of the tool in an active position.

DETAILED DESCRIPTION OF THE INVENTION

As shown, the tool proposed comprises a pneumatic actuator 10 comprising a body 11 with a base section 12 and integrated, on the opposite side, by a head element 13, screwed into it or however fixed to it.

The body 10 is preferably cylindrical and forms a chamber 14 open towards the head element 13 and in communication with a bottom hole 15 to which a feed conduit of a fluid under pressure, typically air, is connected. Said chamber 14 extends according to an X axis, and a piston 16 is housed in it with a relative seal 16', which can be single or double acting.

In the example illustrated, the piston 16 is single acting and movable in one direction by means of the fluid under pressure fed through said bottom hole 15 and in the opposite direction by means of a return spring 17 placed between the piston 16 and the head element 13.

This head element 13 is provided with a seat 18 on a Y axis at a right angle to the X axis of the chamber 14 with a piston. The seat 18 has an opening towards the chamber 14 and a gripper jaw 19 is housed and slides in it holding a front jaw 20. The gripper jaw 19 is connected to the piston 16 by means of a transmission lever 21 at 90°, which connects one with the other by means of coupling pins or plugs 22, 22', where the ends of the plug 22', connecting the lever to the jaw, extend and are conducted in guide slots 23 provided in opposite sides of the head element 13.

In this way the movements of the piston 16 in the chamber 14 according to the X axis correspond to the movements of the gripper jaw 19 according to the Y axis between an idle position, in which the gripper jaw is back in the housing 18—FIGS. 2 and 4, and an active position, in which the gripper jaw 19 emerges from said housing—FIGS. 3 and 6—, this active position generally being caused by the movement of the piston by the fluid under pressure.

It should be pointed out that the single finger gripper described above, thanks to its configuration, besides being compact and, therefore, easier to use, has the advantage of being able to be assembled during use without the need for specific fasteners. In fact, supports already available in the sector and suitable also to vary and stabilize the orientation of the device according to needs can be used. Furthermore, the body of the device can be set up also to apply sensors indicating the active and idle positions of the gripper jaw.

The invention claimed is:

1. A one-finger gripper comprising:
a pneumatic actuator with a control piston that is connected to a gripper jaw for the movement of the gripper jaw between an active and an idle position, wherein said gripper jaw is set up for and susceptible to linear movements on an axis at a right angle to an axis of the control piston, said control piston and said gripper jaw being connected by means of a transmission lever at 90°, said gripper jaw being connected to said control piston by means of said transmission lever pivoted on one side to said control piston and on another side to said gripper jaw by means of coupling pins or plugs, one of said pins or plugs connecting said lever to said gripper having ends positioned in slots provided in opposite sides of a head element.

2. A one-finger gripper according to claim 1, wherein the pneumatic actuator comprises a body with a base portion and integrated, on the opposite part, by said head element, wherein said body forms a chamber that extends according to the axis of said control piston and houses said control piston and said head element forms a seat that extends according to the axis at said right angle to said axis of said control piston and in which is housed and slides the gripper jaw connected to the control piston.

3. A one-finger gripper according to claim 2, wherein said body is cylindrical.

4. A one-finger gripper according to claim 1, wherein the control piston is single acting and is moveable in one direction by means of a fluid under pressure and in the opposite direction by a return spring.

5. A one-finger gripper according to claim 1, wherein the control piston is double acting.

6. A one-finger gripper comprising:

a pneumatic actuator comprising a control piston, a gripper jaw, a transmission lever, coupling pins or plugs and a head element, said control piston having a control piston axis, said transmission lever being pivotably connected to said control piston and said gripper jaw such that said gripper jaw is movable between an active position and an idle position in a direction perpendicular to said control piston axis, one side of said transmission lever being pivotably connected to said control piston and another side of said transmission lever being pivotably connected to said gripper via said pins or plugs, said control piston being perpendicular to said gripper jaw, said head element having a first slot and a second slot, said first slot being located on one side of said head element, said second slot being located on another side of said head element, said first slot being opposite said second slot, one of said pins or plugs having a first end and a second end, one of said first end and said second end being arranged in one of said first slot and said second slot, another of said first end and said second end being arranged in another one of said first slot and said second slot.

7. A one-finger gripper according to claim 6, wherein the pneumatic actuator comprises a body with a base portion and integrated, on the opposite part, by said head element, wherein said body forms a chamber that extends along said control piston axis, said chamber receiving at least a portion of said control piston, said head element forming a seat extending in said direction perpendicular to said control piston axis, at least a portion of said gripper jaw being arranged in said seat in said idle position.

8. A one-finger gripper according to claim 7, wherein said body is cylindrical.

9. A one-finger gripper according to claim 6, wherein said pneumatic actuator comprises a return spring, said piston being a single acting piston, said single acting piston being moveable in one direction by means of a fluid under pressure, said single acting piston being movable in a direction opposite said one direction via said return spring.

10. A one-finger gripper according to claim 6, wherein said piston is double acting.

11. A one-finger gripper comprising:

a control piston;
a gripper jaw having a gripper jaw axis;
a transmission lever;
coupling pins or plugs; and
a head element, said control piston having a control piston axis, said control piston axis being perpendicular to said gripper jaw axis, said transmission lever being pivotably connected to said control piston and said gripper jaw such that said gripper jaw is movable between an active position and an idle position, one side of said transmission lever being pivotably connected to said control piston via one of said pins or plugs and another side of said transmission lever being pivotably connected to said gripper via another one of said pins or plugs, said control piston being perpendicular to said gripper jaw, said head element having a first slot and a second slot, said first slot being located on one side of said head element, said second slot being located on another side of said head element, said one side being opposite said another side, said another one of said pins or plugs having a first end and a second end, one of said first end and said second end being arranged in one of said first slot and said second slot, another of said first end and said second end being arranged in another one of said first slot and said second slot.

12. A one-finger gripper according to claim 11, further comprising a body with a base portion and integrated, on the opposite part, by said head element, wherein said body forms a chamber that extends along said control piston axis, said chamber receiving at least a portion of said control piston, said head element forming a seat extending in a direction of said gripper jaw axis, at least a portion of said gripper jaw being arranged in said seat in said idle position.

13. A one-finger gripper according to claim 12, wherein said body is cylindrical.

14. A one-finger gripper according to claim 11, further comprising a return spring, said piston being a single acting piston, said single acting piston being moveable in one direction by means of a fluid under pressure, said single acting piston being movable in a direction opposite said one direction via said return spring.

15. A one-finger gripper according to claim 11, wherein said piston is double acting.

* * * * *